April 12, 1960 W. L. STACE ET AL 2,932,284
REVERSING MEANS FOR FLUID ACTUATED CHUCK
Filed Feb. 6, 1958
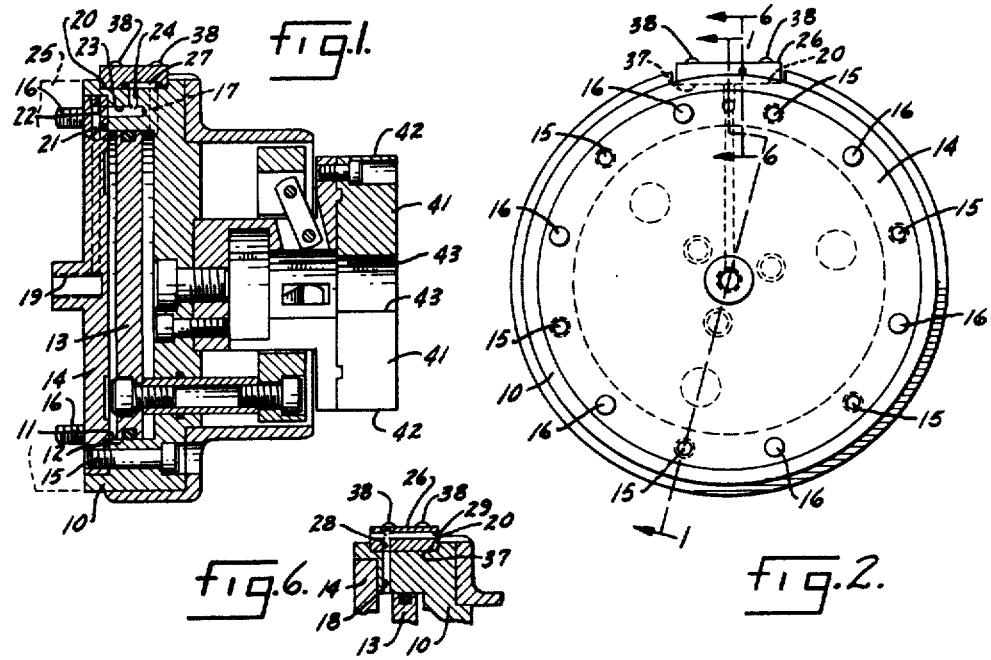
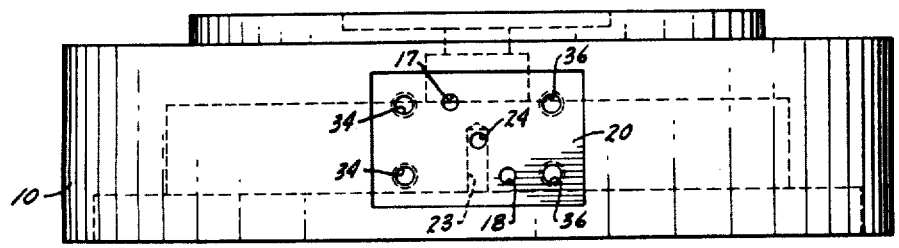
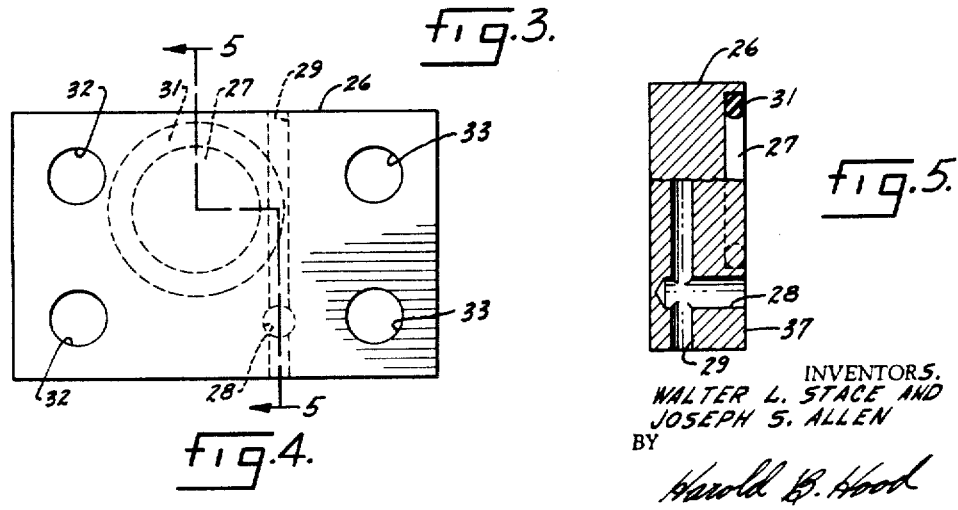
INVENTORS.
WALTER L. STACE AND
JOSEPH S. ALLEN
BY
Harold B. Hood
ATTORNEY.

United States Patent Office 2,932,284
Patented Apr. 12, 1960

2,932,284
REVERSING MEANS FOR FLUID ACTUATED CHUCK

Walter L. Stace and Joseph S. Allen, Indianapolis, Ind.

Application February 6, 1958, Serial No. 713,675

6 Claims. (Cl. 121—46.5)

The present invention relates to apparatus for controlling the flow of fluid and more particularly relates to apparatus for operating a chuck by channeling the flow of a fluid to or from either side of a piston operatively connected to the chuck.

Reference is made to our United States Patent No. 2,784,002, issued March 5, 1957, and entitled "Fluid-Actuated Chuck" in which patent, a chuck, with which our present invention is primarily adapted for use, is disclosed in detail and claimed. While the chuck of Patent No. 2,784,002 possessed certain advantages not theretofore known in the art, certain further improvements have been conceived which form the subject matter of this invention. Referring to the drawings of the above-mentioned patent, it can be seen that the chuck will be operated as an outside chuck (so as to grasp a work piece on the outside thereof) when the back plate 14 is in one position and will be operated as an inside chuck (so as to grasp a work piece on the inside thereof) when the back plate 14 is turned, relative to the rest of the assembly, through an angle of 180°. Such adjustment of the plate 14 requires removal of the chuck from its mounting, i.e., removal of screws 16—16 and also removal of screws 15—15 which retain the back plate 14 in association with the base 10.

It is therefore an object of the present invention to provide apparatus for reversing the operation of such a chuck without removing the chuck from its mounting and without other time-consuming disassembly and assembly.

A further object of our invention is to provide apparatus for controlling the flow of fluid.

Still a further object of our invention is to provide improved apparatus for operating a chuck by channeling the flow of fluid to or from either side of a piston operatively connected to the chuck.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a longitudinal sectional view of a chuck constructed in accordance with our invention, the view being taken substantially along the line 1—1 of Fig. 2 and showing the internal construction of the chuck;

Fig. 2 is a rear elevation of the chuck;

Fig. 3 is an enlarged top view of a base forming a portion of the above-mentioned chuck;

Fig. 4 is a further enlarged top view of a plate which engages a flattened portion of the base and which also forms a portion of the above-mentioned chuck;

Fig. 5 is a sectional view of the plate of Fig. 4 taken substantially along the line 5—5 of Fig. 4 and showing the internal construction of the plate; and Fig. 6 is a fragmentary sectional view of the chuck taken substantially along the line 6—6 of Fig. 2 and showing certain internal features of the chuck.

Referring now to the drawings, and more particularly to Figs. 1 to 3 and 6, we have shown our chuck as comprising a base 10 having a cylinder 11 formed therein which opens through one end 12 of the base 10. A piston 13 is reciprocably received in the cylinder 11. A back plate 14 closes the cylinder 11 and is fixed to the base 10 by means of a plurality of screws 15—15 or the like. A further plurality of screws 16—16 is provided for fixing the chuck to a mounting 25 (suggested in dotted lines) such as a lathe face plate or the like.

The base 10 is provided with a first passage 17 opening on a flattened portion 20 of the base 10 and communicating with the cylinder 11 on one side of the piston 13. A second passage 18 (Figs. 3 and 6), which is formed in the base 10, opens in similar fashion on the flattened portion 20 of the base 10 and communicates with the cylinder 11 on the opposite side of the piston 13. The piston 13 may be forced leftwardly as viewed in Fig. 1 by supplying fluid under pressure to the cylinder 11 through the passage 17 and by simultaneously allowing fluid to be forced out of the cylinder 11 from the opposite side of the piston 13 through the passage 18. In like manner the piston 13 may be moved rightwardly by supplying fluid under pressure to the cylinder 11 through the passage 18 and allowing fluid to exhaust through the passage 17.

The back plate 14 has a tapped bore 19 adapted to be connected to a source of fluid under pressure. The bore 19 intersects bore 21 which in turn intersects bore 22 to form a passageway through the back plate 14. The bore 22 registers with a bore 23 in the base 10 which intersects a bore 24, the mouth of which opens on the flattened portion 20 of the base 10 between and in line with the openings of the passages 17 and 18. Thus it can be seen that a third passage through the base 10 beginning with the bore 19 and ending with the bore 24 has been provided for the passage of fluid under pressure.

Referring now to all the figures, a top plate 26 is provided with a cavity 27 having an O-ring 31 therein and is also provided with bores 28 and 29 which bores form a passageway through the top plate 26. The bore 28 and the cavity 27 both open on a flat surface 37 of the plate 26 which may be held in contact with the flattened portion 20 of the base 10 in either of two positions by means of a plurality of screws 38—38 of screws extending through two pairs of apertures or holes, 32—32 and 33—33, and threaded into two pairs of threaded holes or bores 34—34 and 36—36, opening through the surface 20.

The first of the above-mentioned two positions is depicted in Figs. 1 and 6 and is one in which the cavity 27 overlaps the bores 24 and 17 and the bore 28 is in registry with the bore 18. In such a first position admission of fluid pressure to the threaded bore 19 causes the piston 13 to be moved leftwardly as a result of fluid pressure passing into the cylinder 11 through the bores 19, 21, 22, 23 and 24, cavity 27 and passage 17. Simultaneously, fluid will pass to the atmosphere from the cylinder 11 through the passage 18 and bores 28 and 29 (Fig. 6), thus allowing the leftward movement of the piston.

Referring now to Fig. 3, it should at this point be noted that the bores 17 and 18 are equally and oppositely offset from the horizontal center line and from the vertical center line of the rectangle defined by the two pairs of threaded bores, 34—34 and 36—36, while the bore 24 is at the point of intersection of the diagonals of that rectangle. Referring now to Fig. 4 it can be seen that the holes 32—32 and 33—33 form a rectangle (hereinafter called "plate rectangle") which is congruent to the rectangle formed by the threaded bores 34—34 and 36—36 (hereinafter called "body rectangle"). When the top plate 26 is assembled in the above-mentioned first position the two rectangles assume the same position in space.

The center of the cavity 27 is angularly offset from the intersection of the vertical and horizontal center lines of the plate rectangle. The angle of center offset and the diameter of the cavity 27 are such that the cavity 27 spans the bores 17 and 24 when the top plate 26 is attached in the above-mentioned first position. Furthermore, the center of the cavity 27 is located at the midpoint of a line drawn between the centers of the bores 17 and 24 when the top plate is attached in said first position. The center of the bore 28 is located at an angle of 180° from the center of the cavity 27, the vertex of said angle being located at the intersection of the vertical and horizontal center lines of the plate rectangle, and is spaced from said intersection a distance equal to twice the distance between said intersection and the center of said cavity 27.

The second of the above-mentioned two positions of the top plate 26 is achieved in the following manner. The plurality 38—38 of screws are removed from holes 32—32 and 33—33 and from threaded bores 34—34 and 36—36. The plate 26 is rotated 180° and the surface 20 of the base 10 and surface 37 of the plate 26 are brought together with the holes 32—32 in registry with the threaded bores 36—36 and with the holes 33—33 in registry with the threaded bores 34—34. The plate 26 is then attached securely to the base 10 by means of the plurality 38—38 of screws.

Because of the above described locations and sizes of the bores 17, 18, 24 and 28, cavity 27, threaded bores 34—34 and 36—36, and holes 32—32 and 33—33, in such a second position the cavity 27 spans the bores 24 and 18 and the bore 28 is in registry with the bore 17. When the plate is arranged in such a position, admission of fluid pressure to the bore 19 causes the piston 13 to be moved rightwardly because the passage 18 is then connected to the pressure source and the passage 17 may then exhaust to the atmosphere.

For further details regarding the construction and operation of the operative portions of the chuck between the piston 13 and blocks 41—41, reference is made to our above-mentioned Patent No. 2,784,002. It is sufficient here to state that a forcing of the piston 13 leftwardly, as shown in Fig. 1, causes the blocks 41—41 to move outwardly resulting in the chuck acting as an inside chuck with outer faces 42—42 of the blocks 41—41 gripping a work piece. In similar fashion forcing of the piston 13 rightwardly, as shown in Fig. 1, causes the blocks 41—41 to move inwardly resulting in the chuck acting as an outside chuck with the inner faces 43—43 of the blocks 41—41 gripping a work piece.

We claim as our invention:

1. An apparatus for controlling the flow of fluid which comprises a first member having a first, second and third passage opening on a surface of said first member, a fluid pressure, source communicating with said third passage, a second member having a cavity in a surface of said second member and also having a passageway opening on said second member surface and extending through said second member, means for removably attaching said second member to said first member to cause contact between said first and second member surfaces in either of two positions, one of said positions being one in which said cavity overlaps said first and third passages and said second passage is in registry with said passageway, the other of said positions being one in which said cavity overlaps said second and third passages and said first passage is in registry with said passageway.

2. An apparatus for controlling the flow of fluid which comprises a body having a flat surface and having a first and second passage in said body opening on said body surface, a fluid pressure source, said body also having a third passage therein opening on said body surface between said first and second passages and communicating with said fluid pressure source, a member formed with a flat surface, said member having a cavity opening on said member surface and having a passageway extending through said member and opening on said member surface, said cavity and said passageway being of such sizes and relative locations that said surfaces may be contacted with one another in either of two positions, one of said positions being such that said cavity overlaps said first and third passage openings and said second passage is in registry with said passageway, the other of said positions being such that said cavity overlaps said second and third passage openings and said first passage is in registry with said passageway, and means for removably securing said body to said member in either of said two positions.

3. An apparatus for channeling the flow of pressurized fluid from the most central of three circular, approximately equal sized, aligned, equally spaced openings in a flat surface of a base to one of the outward openings and for simultaneously connecting the other outward opening with the atmosphere, which comprises a plate formed with a flat surface and having a cylindrical cavity opening on said surface thereof, the diameter of said cavity being approximately equal to the spacing between the centers of adjacent ones of said openings plus the diameter of one of said openings, said plate having a passageway extending therethrough and opening on said plate surface at a distance from said cavity approximately equal to the distance between two adjacent base openings, a plurality of screws, said base having an equal plurality of threaded holes for the reception of said plurality of screws, said plate having an equal plurality of apertures therethrough for the reception of said screws, said holes and apertures being so arranged in said base and plate, respectively, that said screws may be used to attach said plate to said base in either of two positions, one of said positions being one in which said cavity spans the most central and one of the outward openings in said base and said passageway registers with the other of the outward openings, the other of said positions being one in which said cavity overlaps the most central and said other of the outward openings in said base and said passageway registers with said one of the outward openings.

4. An apparatus for moving a piston which comprises a base having a cylinder formed therein and having an outside surface, a piston reciprocably received within said cylinder, a fluid pressure source, said base having a first passage opening on said base surface and communicating with said cylinder on one side of said piston, said base having a second passage opening on said base surface near said first passage and communicating with said cylinder on the opposite side of said piston, said base having a third passage opening on said base surface and communicating with said fluid pressure source, a member having a cavity in a surface thereof and also having a passageway opening on said surface thereof and extending through said member, means for removably attaching said member to said base to cause contact between said base and member surfaces in either of two positions, one of said positions being one in which said cavity overlaps said first and third passages and said second passage is in registry with said passageway, the other of said positions being one in which said cavity overlaps said second and third passages and said first passage is in registry with said passageway.

5. An apparatus for moving a piston which comprises a base having a flat surface formed thereon and having a cylinder formed therein, a piston recipocably received within said cylinder, a fluid pressure source, said base having a first passage opening on said base surface and communicating with said cylinder on one side of said piston, said base having a second passage opening on said base surface and communicating with said cylinder on the opposite side of said piston, said base having a third passage opening on said base surface between said first and second passages and communicating with said fluid pressure source, a member formed with a flat surface, said member having a cavity opening on said member surface and having a passageway extending through said member and opening on said member surface, said cavity and said passageway being of such sizes and relative location that said base and member surfaces may be contacted in either of two positions, one of said positions being such that said cavity overlaps said first and third passage openings and said second passage is in registry with said passageway, the other of said positions being such that said cavity overlaps said second and third passage openings and said first passage is in registry with said passageway, and means for removably securing said body to said member in either of said two positions.

6. An apparatus for controlling the flow of fluid which comprises a first member formed to provide a first passage having a mouth opening through a surface of said first member, a second passage having a mouth opening through said surface, and a third passage having a mouth opening through said surface, a second member having a single surface formed for mating engagement with the surface of said first member, said second member single surface being formed to provide, when engaged with said first member surface in one of two alternative positions, communication between said third passage mouth and said first passage mouth and communication between said second passage mouth and the atmosphere, and to provide, when engaged with said first member surface in the other of said positions, communication between said third passage mouth and said second passage mouth and communication between said first passage mouth and the atmosphere, and means for selectively securing said second member to said first member in either of said alternative positions.

References Cited in the file of this patent

UNITED STATES PATENTS

| | | |
|---|---|---|
| 1,300,220 | Minard | Apr. 8, 1919 |
| 2,335,923 | Dube | Dec. 7, 1943 |
| 2,344,714 | Martin | Mar. 21, 1944 |
| 2,568,092 | Sloan et al. | Sept. 18, 1951 |
| 2,655,383 | Palo | Oct. 13, 1953 |
| 2,784,002 | Stace et al. | Mar. 5, 1957 |
| 2,809,612 | Highberg | Oct. 15, 1957 |

UNITED STATES PATENT OFFICE
CERTIFICATE OF CORRECTION

Patent No. 2,932,284             April 12, 1960

Walter L. Stace et al.

It is hereby certified that error appears in the printed specification of the above numbered patent requiring correction and that the said Letters Patent should read as corrected below.

Column 3, line 57, after "pressure" strike out the comma.

Signed and sealed this 13th day of September 1960.

(SEAL)
Attest:

KARL H. AXLINE             ROBERT C. WATSON
Attesting Officer             Commissioner of Patents